United States Patent Office 2,806,764
Patented Sept. 17, 1957

---

2,806,764

URANIUM RECOVERY AND PURIFICATION PROCESS AND PRODUCTION OF HIGH PURITY URANIUM TETRAFLUORIDE

Richard H. Bailes, Walnut Creek, and Ray S. Long and Robert R. Grinstead, Concord, Calif., assignors, by mesne assignments, to the United States of America as represented by the United States Atomic Energy Commission No Drawing. Application June 16, 1953, Serial No. 362,123

10 Claims. (Cl. 23—14.5)

The present invention relates to a process wherein an anionic exchange process is employed to separate uranium from a large variety of impurities yielding a purified solution from which high purity uranium tetrafluoride can be obtained.

Uranium, as obtained from the treatment of various sources such as phosphate and carnotite ores as well as from a variety of industrial operations, is often contaminated with a large variety of other elements. It is difficult to obtain high-purity uranium compounds from such a source due to the similar behavior of impurity components and uranium during standard chemical processing treatments. For example, many of the impurities may either act as precipitants or as coprecipitants or carriers for the uranium thereby requiring a variety of operations to obtain the desired degree of purity.

Now, it has been found that very efficient and economical purification of contaminated uranium can be achieved in an ion exchange process. Such process includes the treatment of the contaminated uranium to produce a solution thereof containing a high concentration of chloride. Under these conditions the uranium exists as anionic chloride complexes. Thenceforth, the uranium chloride complex is adsorbed from the solution on an anionic exchange resin, whereby a portion of the impurities remain in the solution and others are retained with the uranium by the resin. Adsorbed impurities are then removed by washing the resin with pure concentrated hydrochloric acid after which operation the uranium is eluted with pure water yielding an acidic uranyl chloride solution of high purity. Subsequently, the uranyl chloride solution is reduced by electrolysis and uranium tetrafluoride precipitated by the addition of hydrofluoric acid.

Accordingly, it is an object of the invention to provide a process for purifying and recovering uranium from contaminated sources thereof.

Another object of the invention is to provide a process for purifying and recovering uranium, wherein a contaminated aqueous solution of the uranium is treated with a chloride material to produce uranium chloride complex anions therein.

Still another object of the invention is to provide a process for purifying and recovering uranium, wherein an anionic exchange resin is employed to adsorb anionic uranium chloride complexes from a contaminated chloride solution thereof.

A further object of the invention is to provide a process for recovering and purifying uranium wherein pure concentrated hydrochloric acid is employed to remove impurities adsorbed together with uranium chloride complex anions on an anionic exchange resin whenceforth water elution yields a purified uranyl chloride solution of the uranium.

A still further object of the invention is to provide a process for recovering and purifying uranium wherein purified uranium tetrafluoride is precipitated from an acidic uranyl chloride solution purified by an anionic exchange process.

Other objects and advantages of the invention will become apparent from consideration of the following specification.

The process of the invention is applicable to the purification of uranium obtained from a great many sources and containing a wide variety of contaminants. For example, contaminated materials obtained from primary treatment of various uranium ores such as pitchblende, phosphate rock, carnotite, etc., are easily purified by treatment in the process of the invention. Materials derived by treatment of eluates obtained in the practical operation of the processes disclosed in the copending applications of Richard H. Bailes and Ray S. Long, Serial Number 155,307, filed April 11, 1950, which issued as U. S. Patent No. 2,770,520 on November 13, 1956 and Serial Number 159,744, filed May 3, 1950, which issued as U. S. Patent No. 2,756,123 on July 24, 1956, are especially suited for treatment by the present process.

More particularly, a preliminary treatment is employed whereby a solid impure uranium-containing material is obtained from such eluates, for example, 1 M NaCl eluates. This is accomplished by adding HF thereto, adjusting the pH of the eluate to a value in the range of about 2.5 to 3.5, and then adding a reducing agent such as $Na_2S_2O_4$. The uranium is present in such material principally as uranous phosphate and sodium uranium fluorides. Sodium silicofluorides, V, Fe, Ti, Mo, and Cr will usually be present in minor proportions. A typical analysis may be approximately as follows:

| | Percent |
|---|---|
| U | 40–50 |
| Na | 5–12 |
| F | 25–30 |
| $PO_4$ | 10–20 |
| Si | 2–5 |
| V | 0.1–2 |
| Fe | 0.1 |
| Ti | 1–2 |

In operating the process of the invention, there is first obtained a contaminated solution of the uranium. Solid materials are treated with appropriate reagents whereby there is produced an acidic chloride solution containing the uranium in the hexavalent uranyl state. For example, hydrochloric acid in admixture with a several-fold excess of an oxidizing agent such as $NaClO_3$ may be employed to leach the uranium from solid materials such as the precipitate described above, thereby forming an acidic uranyl chloride solution containing considerable amounts of the indicated impurities. Other acids and/or oxidizing agents could be employed to produce the solution; however, products of greater purity are obtained when chloridic reagents are employed and, therefore, hydrochloric acid solvent and chloridic oxidizing agents are preferred.

The uranyl chloride solution, prepared as above, or a similar solution obtained from any other source is then treated with a soluble chloride to raise the chloride ion concentration above about 5 M. In concentrated chloride solution (above about 5 M), the uranyl ions are complexed forming a negatively charged uranyl chloride complex (anion) instead of a positively charged ion (cation) as would be expected from the uranyl ion formula, $UO_2^{++}$. Vanadium, if present in substantial quantities in the pentavalent form, forms a similar anion; therefore, selective reduction with a little $NaHSO_3$, $SO_2$, or $Na_2S_2O_4$, added to the solution, is desirable to prevent possible contamination of the product. While various soluble chlorides, i. e., alkali metal and alkaline earth metal chlorides, produce a similar complexing effect, hydrochloric acid is preferred as the complexing agent since removal of impurities is more easily effected during subsequent operations. Adsorbability of the uranium anionic chloride complex is at a maximum when the hydrochloric acid has a concentration of about 8 M.

Following formation of the anionic uranyl chloridic complex the solution is contacted with an anionic exchange resin, preferably of the highly basic type. Such resins are essentially very high molecular weight organic materials which form a matrix supporting numerous substituent reactive groups, e. g., quaternary ammonium or guanidinium substituents. Dowex 1 and 2, strongly basic anionic exchange resins, employed in the various operations of the following descriptions and illustrative examples, are stated by the manufacturer to be equivalent in function and substantially the same. These materials are manufactured by procedures which are substantially the same as described in Examples 2 and 4 of U. S. Patent No. 2,614,099, filed December 29, 1948, and issued October 14, 1952. Contact of the solution with the resin is preferably made in a column. As a result of this operation, the uranyl chloride complex anions are adsorbed by the resin together with some impurities. Chloride or sulfate forms of the resin are suitable for this operation as these materials are displaced during the uranyl chloride complex adsorption and appear in the effluent solution.

Impurity materials adsorbed on the resin and occluded solution are removed by washing the column with pure hydrochloric acid having a concentration above about 5.0 M. It is essential to use pure hydrochloric acid as the impurities are effectively removed thereby, and contamination from impurities in the acid is avoided. Acid having a concentration lower than about 5.0 M removes undesirable amounts of the uranium since below this value hydrochloric acid is an effective elutriant for the uranium.

In practice, it has been found that a volume of acid roughly equivalent to the original solution volume is required to reduce the impurity contamination to the desired level. Some uranium appears in the wash solution; however, since such solution can be utilized as the solution used to leach the uranium, as noted above, this uranium can eventually be recovered.

The uranium is readily eluted from the column following the washing operation merely by passing pure water therethrough. During this operation the water effectively dilutes acid adsorbed or occluded by the resin column and destroys the anionic uranyl chloride complex thereby allowing the uranium to be eluted as uranyl chloride. Accordingly, there is obtained an acidic uranyl chloride solution of high purity, wherein the total chloride concentration is considerably below 5 M. Evaporation of this solution and/or treatment with many known precipitant reagents will allow eventual recovery of the uranium in a variety of high-purity forms. Moreover, in accordance with the invention, the uranium from this high-purity uranyl chloride solution can be converted into high-purity uranium tetrafluoride by the following especially adapted treatment:

After twofold dilution with water, the high-purity eluate is reduced in the cathode compartment of an electrolytic cell having a mercury cathode. The use of the electrolytic reduction is essential since the eluate is not contaminated as it would be by added chemical reducing agents. Following electrolytic reduction the solution is treated with HF solution, thereby precipitating a high-purity uranium tetrafluoride. Such precipitate is then separated from the solution, as by filtering, and is dried by heating to about 110° C.

Further details of the invention will become apparent from the following examples:

Example I

A precipitate obtained as described above from a 1 M NaCl eluate was employed. Such material had the following approximate composition:

|  | Percent |
|---|---|
| U | 40–50 |
| F | 30 |
| Na | 5–10 |
| $PO_4\equiv$ | 10–20 |
| V | 1–2 |
| Ti | 1–2 |
| Fe | 0.1 |
| Si | 2–3 |

This material was leached with 8 M HCl and $NaClO_3$ in an amount of a few tenths of a gram per gram of uranium as required to oxidize the uranium from the +4 to the +6 state. A similar small amount of $Na_2S_2O_4$ was added to reduce pentavalent V to the tetravalent state. Filtration was employed to remove a small amount of undissolved $Na_2SiF_6$ from the solution.

The solution was contacted at a flow rate of 5 ml./min. with 100-mesh, Dowex-1 resin, a strongly basic anionic exchange resin. 100 ml. of wet settled resin disposed in a ½" x 24" column was employed during this operation. As a result of this operation, uranium adsorption was 99.8% complete prior to break-through in each of two separate runs. A volume of pure HCl equal to the original volume of solution was passed through the column to remove impurities and then pure water was used to elute the uranium.

After twofold dilution of the uranium eluate, electrolytic reduction in the mercury cathode compartment of an electrolytic cell was employed to reduce the uranium to the tetravalent state. Following the removal from the cell, 48% HF was added to the solution to precipitate uranium tetrafluoride from the solution, which precipitate after filtering and drying at 110° C., analyzed as follows:

|  | Percent |
|---|---|
| $UF_4$ | 96 |
| $PO_4\equiv$ | 0.04 |
| Na | <0.1 |
| Ti | 0.002 |
| Fe | 0.01 |
| V | 0.007 |
| Si | >0.1 |

The principal impurity present appeared to be water retained due to low-temperature of drying.

Example II

A precipitate, similar to those above, obtained by treatment of a 1 M NaCl eluate with HF and $Na_2S_2O_4$ and containing 46% of uranium was leached with 8 M HCl solutions and 1 to 5 times the stoichiometric amounts of $NaClO_3$, as an oxidizing agent. The leach solution contained uranium equivalent to about 30 grams of $U_3O_8$ per liter. As it was desired to employ a more concentrated solution C. P. $UO_2SO_4 \cdot 2H_2O$ was added to raise the concentration to 61.6 grams per liter.

75 ml. of wet-settled Dowex–1 was placed in a Fluorex glass column 13 mm. in diameter and 605 mm. in length. 300 ml. of the fortified leach liquor was passed through the column at a rate of 2.4 ml./min./sq. in. of column area. The estimated capacity of the column at saturation was about 220 mg. $U_3O_8$ per ml. of resin, while breakthrough occurred at about 144 mg. $U_3O_8$ per ml.

350 ml. of 8 M HCl was employed to wash the impurities from the column at the same flow rate as used for the original solution, thereby thoroughly removing at least the residual $PO_4\equiv$, V and Ti. $H_2O$ was then employed to elute the uranium from the column and uranium tetrafluoride prepared as described above.

The present process has several advantageous features which should be apparent from the foregoing. As a result of the earlier precipitation and leaching operations, concentrated uranium solutions are produced which then may be advantageously treated in the anionic exchange column. As a result of this concentration, which may amount to as much as 30–50 fold, small resin columns may be used and the various reagents employed in much smaller amounts. Also, the purification achieved during adsorption is greater as the uranyl complex adsorption is favored by the higher uranium concentration in the solution.

Moreover, it will be apparent that the purification will be effective for removing a great many impurities besides those specified above. The specified materials are considered representative of various groups into which the specified materials are logically classified. The alkali metals and alkaline earth metals, generally, should behave as does sodium and be eliminated principally during adsorption and finally by the washing step. Various anions such as $SO_4^=$ should behave as does $PO_4\equiv$ or $H_2PO_4-$, the form in which phosphate impurity exists in the leach solution. The behavior of the various heavy metals specified should be indicative of the behavior of other heavy metals not specified.

Uranium tetrafluoride, purified by the present process, is valuable as a chemical reagent and as an intermediate in the production of other pure uranium compounds. The purity of the product is sufficient to meet even the exacting requirements of a raw material for further fluorination to uranium hexafluoride as employed in various vacuum processes including multiple stage diffusion.

While in the foregoing there has been described what may be considered to be preferred embodiments of the invention, modifications thereof will be apparent to those skilled in the art, and it is intended to cover all such as fall within the scope of the appended claims.

What is claimed is:

1. A process for purifying and recovering uranium values from a contamined solid, comprising leaching uranium values from said material with an acidic solution thereby producing a contaminated uranium solution, treating said solution with an oxidizing agent to place all of the uranium in the hexavalent state, adding sufficient soluble chloride to said solution to increase the chloride content above about 5 M, whereby the said hexavalent uranium is converted to uranyl chloride complex anion, contacting said solution with a highly basic anionic exchange resin to adsorb said uranyl chloride complex anion thereon, washing occluded solution and impurities from the resin with HCl of above 5 M concentration, eluting the purified uranium values with water, reducing the uranium to the tetravalent state in the eluate solution by electrolysis, and precipitating the tetravalent uranium as uranium tetrafluoride by adding HF to the eluate solution.

2. A process for purifying and recovering uranium values from a contaminated solid, comprising leaching uranium values from said material with a hydrochloric acid solution thereby producing a contaminated uranium chloride solution, treating said solution with an oxidizing agent to place all of the uranium in the hexavalent state, adding sufficient hydrochloric acid to said solution to increase the chloride content above about 5 M, whereby the said hexavalent uranium is converted to a uranyl chloride complex anion, contacting said solution with a highly basic anionic exchange resin to adsorb said uranyl chloride complex anion thereon, washing occluded solution and impurities from the resin with HCl of above 5 M concentration, eluting the purified uranium values with water, reducing the uranium to the tetravalent state in the eluate solution by electrolysis, and precipitating the tetravalent uranium as uranium tetrafluoride by adding HF to the eluate solution.

3. A process for purifying and recovering uranium values including a tetravalent form thereof from a contaminated solid, comprising leaching said solid with hydrochloric acid of above about 5 M concentration and with the addition of an oxidizing agent thereby producing a contaminated solution containing the uranium values in an anionic uranyl chloride complex form, contacting said solution with a highly basic anionic exchange resin whereby the uranyl chloride complex is adsorbed thereon together with impurities, washing said resin with hydrochloric acid of above about 5 M concentration to remove impurities and leave the uranium adsorbed on the resin, eluting the purified uranium with water, electrolyzing the eluate solution to reduce the uranium to a tetravalent state in the eluate solution, and precipitating uranium tetrafluoride from the eluate solution.

4. A process for purifying and recovering uranium values including a tetravalent form thereof from a contaminated solid, comprising leaching said solid with hydrochloric acid of about 8 M concentration and with the addition of an oxidizing agent thereby producing a contaminated solution containing the uranium values in an anionic uranyl chloride complex form, contacting said solution with a highly basic anionic exchange resin whereby the uranyl chloride complex is adsorbed thereon together with impurities, washing said resin with hydrochloric acid of about 8 M concentration to remove impurities and leave the uranium adsorbed on the resin, eluting the purified uranium with water, electrolyzing the eluate solution to reduce the uranium to a tetravalent state in the eluate solution and precipitating uranium tetrafluoride from the eluate solution.

5. A process for purifying and recovering uranium values including a tetravalent form thereof from a contaminated solid, comprising leaching said solid with hydrochloric acid of above about 5 M concentration and with the addition of an oxidizing agent thereby producing a contaminated solution containing the uranium values in an anionic uranyl chloride complex form, contacting said solution with a highly basic anionic exchange resin whereby the uranyl chloride complex is adsorbed thereon together with impurities, washing said resin with hydrochloric acid of above about 5 M concentration to remove impurities and leave the uranium adsorbed on the resin, eluting the purified uranium with water, and recovering the purified uranium from the eluate solution.

6. A process for purifying and recovering uranium values including a tetravalent form thereof from a contaminated solid having some vanadium included therein, comprising leaching said solid with hydrochloric acid of above about 5 M concentration and with the addition of an oxidizing agent thereby producing a contaminated solution containing the uranium values in an anionic uranyl chloride complex form, treating the solution with a reducing agent to selectively reduce vanadium therein to a tetravalent state, contacting said solution with a highly basic anionic exchange resin whereby the uranyl chloride complex is adsorbed thereon together with impurities, washing said resin with hydrochloric acid of above about 5 M concentration to remove impurities and leave the uranium adsorbed on the resin, eluting the purified uranium with water, electrolyzing the eluate solution to reduce the uranium to a tetravalent state in the eluate solution, and precipitating uranium tetrafluoride from the eluate solution.

7. A process for purifying and recovering uranium values including a tetravalent form thereof from a contaminated solid having some vanadium included therein, comprising leaching said solid with hydrochloric acid of about 8 M concentration and with the addition of an oxidizing agent thereby producing a contaminated solution containing the uranium values in an anionic uranyl chloride complex form, treating the solution with a reducing agent to selectively reduce vanadium therein to a tetravalent state, contacting said solution with a highly basic anionic exchange resin whereby the uranyl chloride complex is adsorbed thereon together with impurities, washing said resin with hydrochloric acid of about 8 M concentration to remove impurities and leave the uranium adsorbed on the resin, eluting the purified uranium with water, electrolyzing the eluate solution to reduce the uranium to a tetravalent state in the eluate solution, and precipitating uranium tetrafluoride from the eluate solution.

8. In a process for purifying and recovering uranium values from an impure acidic solution thereof, the steps comprising adding sufficient soluble chloride thereto to increase the chloride content above about 5 M, whereby the said hexavalent uranium is converted to a uranyl chloride complex anionic form, contacting said solution with a highly basic anionic exchange resin to adsorb said uranyl chloride complex anion form thereon, washing occluded solution and impurities from the resin with HCl of above 5 M concentration, eluting the purified uranium values with water, reducing the uranium to the tetravalent state in the eluate solution by electrolysis, and precipitating the tetravalent uranium as uranium tetrafluoride by adding HF to the eluate solution.

9. A process for purifying and recovering uranium values including a tetravalent form thereof from a contaminated solid, comprising leaching said solid with hydrochloric acid of above about 5 M concentration and with the addition of an oxidizing agent thereby producing a contaminated solution containing the uranium values in an anionic uranyl chloride complex form, contacting said solution with a highly basic anionic exchange resin whereby the uranyl chloride complex is adsorbed thereon together with impurities, washing said resin with hydrochloric acid of above about 5 M concentration to remove impurities and leave the uranium adsorbed on the resin, eluting the purified uranium with water, electrolyzing the eluate solution to reduce the uranium to a tetravalent state in the eluate solution, precipitating uranium tetrafluoride from the eluate solution, and separating the uranium tetrafluoride precipitate from the solution.

10. In a process for purifying and recovering uranium values from a solid containing tetravalent uranium fluorides and phosphates in admixture with impurities, the steps comprising leaching said solid with hydrochloric acid of above about 5 M concentration and with the addition of an oxidizing agent thereby producing a contaminated solution containing the uranium values in an anionic uranyl chloride complex form, contacting said solution with a highly basic anionic exchange resin whereby the uranyl chloride complex is adsorbed thereon together with impurities, washing said resin with hydrochloric acid of above about 5 M concentration to remove impurities and leave the uranium adsorbed on the resin, eluting the purified uranium with water, electrolyzing the eluate solution to reduce the uranium to a tetravalent state in the eluate solution, and precipitating uranium tetrafluoride from the eluate solution.

References Cited in the file of this patent

FOREIGN PATENTS 626,882     Great Britain _____ July 22, 1949